United States Patent [19]

Egly

[11] Patent Number: 4,684,019

[45] Date of Patent: Aug. 4, 1987

[54] DISKETTE STORAGE CONTAINER

[76] Inventor: Robert A. Egly, 31 Belcourt South, Newport Beach, Calif. 92660

[21] Appl. No.: 787,312

[22] Filed: Oct. 15, 1985

[51] Int. Cl.⁴ .............................................. B65D 85/57
[52] U.S. Cl. .................................... 206/309; 206/311; 206/425; 206/444; 211/81; 312/13
[58] Field of Search ............... 206/309, 311, 425, 444, 206/387, 45.18; 312/183, 187, 193, 13; 211/50, 40, 41, 81, 170

[56] References Cited

U.S. PATENT DOCUMENTS

| | | | |
|---|---|---|---|
| 2,042,167 | 5/1936 | Beeler | 220/22.3 |
| 2,665,808 | 1/1954 | McAlister | 206/425 |
| 3,259,748 | 7/1966 | Lammers | 206/45.18 |
| 3,370,701 | 2/1968 | Van Acker et al. | 206/561 |
| 3,556,620 | 1/1971 | Gutierrez | 312/13 |
| 4,212,401 | 7/1980 | Schweizer | 206/45.18 |
| 4,239,307 | 12/1980 | Schweizer | 312/13 |
| 4,289,235 | 9/1981 | Egly | 206/387 |
| 4,366,904 | 1/1983 | Roskvist | 206/425 |
| 4,449,628 | 5/1984 | Egly et al. | 206/425 |
| 4,479,577 | 10/1984 | Eichner et al. | 206/45.18 |
| 4,498,583 | 2/1985 | Long et al. | 206/444 |
| 4,527,692 | 7/1985 | Neuman | 206/45.18 |

FOREIGN PATENT DOCUMENTS 0445712 4/1936 United Kingdom .................. 312/13

Primary Examiner—Stephen Marcus
Assistant Examiner—Jimmy G. Foster
Attorney, Agent, or Firm—George F. Bethel; Patience K. Bethel

[57] ABSTRACT

The following specification discloses a diskette storage container having a base that has four upstanding walls that receive a plurality of pivotal slotted or fan tabbed individualized containers. The individualized pivotal containers have a plurality of slots provided by splines, ledges or webs on either side that receive diskettes therein and include a stepped base for exposing diskettes on a stair stepped basis within the slotted containers. Each individualized container is pivotally held on the base member by means of an upright securement formed as a pair of parallel walls forming a groove therein which receives a spindle formed in the bottom of the pivotal individualized container so that it can provide pivotal movement by the spindle moving in a rotational manner within the channel of the two upright walls forming the groove. The pivotal containers are enclosed within a hinged top cover that seats on the bottom base and provides for a dust cover and a protective case in cooperation with the base. An alternative individualized container of this invention has a flexible fan tab and receipt area for handling multiple stacked disks or diskettes.

10 Claims, 9 Drawing Figures

DISKETTE STORAGE CONTAINER

FIELD OF THE INVENTION

The field of this invention lies within the art of storing magnetic media. More particularly, it lies within the art of storing magnetic media within a container that can be directly accessed by a user. The container is specifically of the type that can display magnetic media in the form of disks or diskettes or other magnetic media for display and removal by a user.

THE PRIOR ART

The prior art with regard to displaying magnetic media and holding magnetic media has comprised a number of various designs. Some of the designs are those described in the patents of the inventor herein, namely, U.S. Pat. No. Des. 251,173, U.S. Pat. Nos. 4,225,038, 4,289,235, 4,369,879 and 4,449,628. However, in all of these designs there is not a showing of the concept of multiple display means in a stair stepped relationship or in a pivotal rotatable movable container. More particularly, none of the prior art patents can be utilized with regard to various container orientations with regard to the multiple stair stepped display of magnetic media and the location of magnetic media within containers on an interrelated basis.

The prior art has also shown certain containers for magnetic media which are placed within a large display box. However, in no case has there been an easy and facile way of accessing magnetic media such as diskettes to the user by merely flipping or paging through a series of containers that are pivotally directed toward a user as in this invention.

Oftentimes in the past, magnetic media such as disks and diskettes were placed in a box similar to a shoe box and merely flipped through in order to find the appropriate disk or diskette. Such a method of retrieving disks or diskettes from the container as can be understood, is cumbersome and difficult. This is due to the fact that the obtaining of the diskettes is like paging through a stack of cards in order to obtain the appropriate diskette.

The prior art has not been directed toward multiple storage containers for magnetic media placed in one large container. Thus, the accessing of plural containers in a single large magnetic media container has not been dealt with. This invention allows the removal and placement of containers on a multiple or plural basis permitting a portion of the magnetic media to be sorted or characterized separately from the rest.

This invention overcomes the difficulties of the prior art cited in the singular containers of the inventor, as well as the methods of placing disks and diskettes in an elongated qued up rack or container.

The diskette container of this invention incorporates a plurality of pivotal containers or buckets. The containers or buckets can have a stair stepped bottom in one embodiment so that the diskettes implaced therein can be qued up on a basis to be viewed in a stair stepped relationship. The stair stepped relationship incorporates a number of side oriented slots or grooves provided by dividers. The side oriented grooves or slots divide the respective stored diskettes so as to be easily accessed by means of the separation in stair stepped relationship.

Each individualized container is pivotally oriented so that it can be pulled forwardly to be accessed in an easy and facile manner. The pivotal orientation is by means of a spindle on the container pivotally oriented within a pair of pincer walls which hold the spindle. The small individual containers can then be pivoted forwardly in order to pull out the respective disks or diskettes stored therein, as well as viewing them. When the small containers are not in use, they can be reoriented back into an upright position. Also, the individual containers can be removed for use at a remote location from the main container.

The individual containers are pivoted in a manner so that they can be moved forwardly sufficiently for removal of disks or diskettes therein, as well as providing visibility and access. When not in use, they can be pivoted backwardly into the upright mode for compact storage.

The entire container can have a transparent or opaque top or cover. The cover can be hinged to the back so as to move backwardly and allow access to the diskettes therein. The entire invention is a step over the state of the art and improves the accessability, storage and overall maintenance of disks and diskettes on a substantially improved basis.

An alternative individualized container of the plural containers incorporates a fan tabbed front with a single compartment configuration. The single compartment container can have multiple disks or diskettes therein which can be accessed or viewed by fanning them against the frontal fan tab thereof.

SUMMARY OF THE INVENTION

In summation, this invention comprises a plurality of individualized containers having a stair stepped base and slots in the side, or a singly compartmentalized fan tabbed container, for maintaining a number of disks or diskettes therein in a pivotal orientation within a base member having a cover thereover.

More particularly, the invention comprises a base member formed with side walls. The base member has a pair of pincer walls in the base thereof, with a plurality of stops.

The pincer walls receive each of the multiple containers therein by means of a spindle of the multiple container that is inserted between the pincer walls. The containers are stopped with regard to their backward movement by means of the stops in the base.

Each individual container has a plurality of slots provided by side channels having dividing guides. The base of the containers have a plurality of steps therein in order to present magnetic media within each slot on a stair stepped basis for viewing.

Overlying the base is a hinged cover which overlies each individualized container. This allows for viewing and access of each individualized container by merely moving the hinged cover backwardly overlying the individualized containers. Thereafter, each individualized container can be canted forwardly and moved to allow for viewing and access of magnetic media stored therein for functional and facile movement and utilization thereof.

Each individual container as an alternative can have a fan tab and singular compartment for storage of a plurality of disks. The disks can be fanned against the fan tab in a flexible manner to provide access to the disks as stored in each container.

DESCRIPTION OF THE PREFERRED EMBODIMENTS

Figure 1:
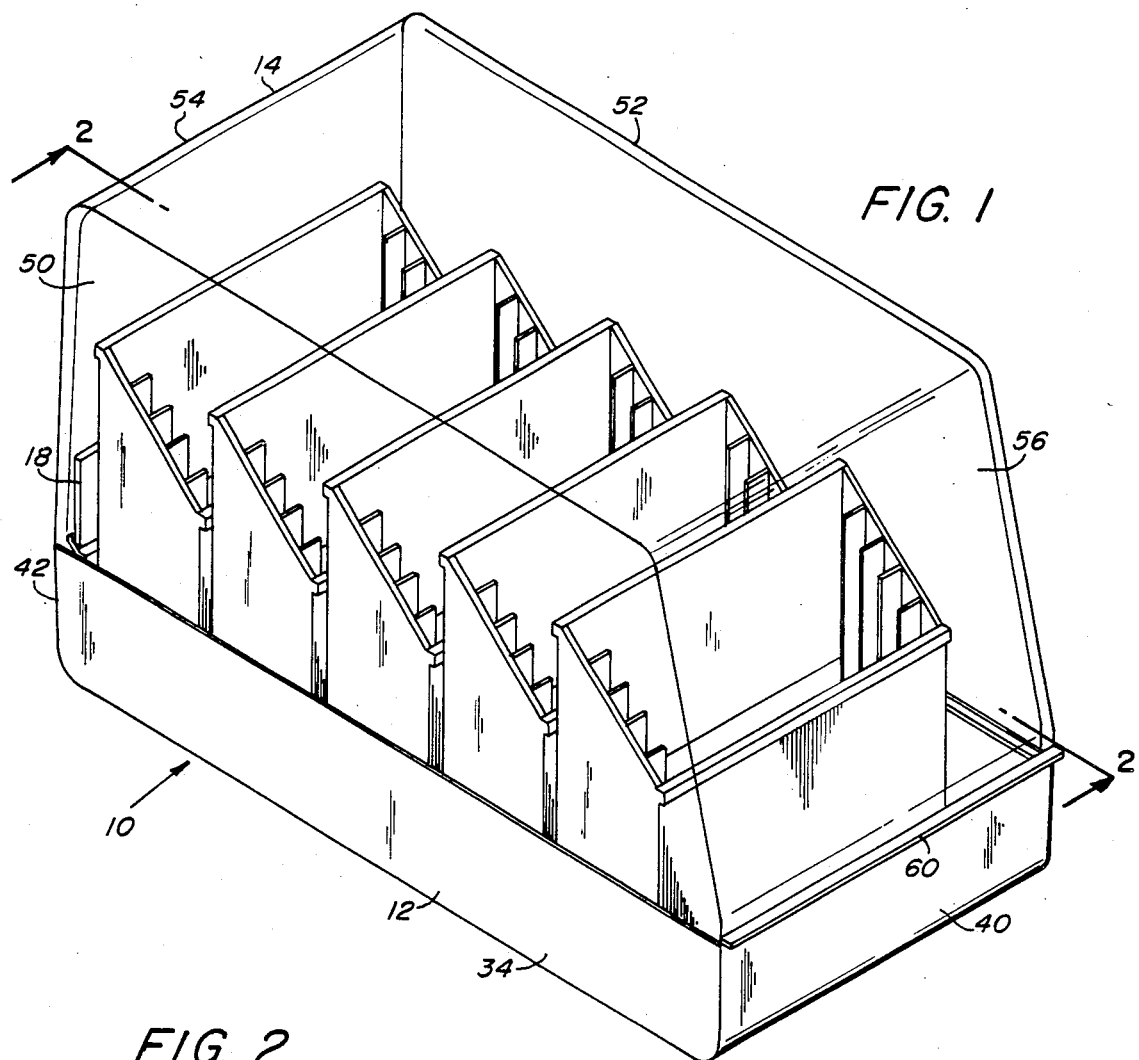
FIG. 1 shows a perspective view of the magnetic media container of this invention.

Looking more particularly at FIG. 1, it can be seen that a container 10 is shown having a base member 12 and a lid or top portion 14. The lid or top portion 14 is hinged to the base 12 by means of a hinge that can be formed as a plastic hinge or a metal hinge 16. The plastic or metal hinge 16 is shown having a hinge member 18 which has been attached to the upper cover portion 14 by means of a suitable fastening means, such as a rivet, heat stake, or other means. In this particular case, it is attached, as can be seen, by means of a riveting member 20 passing through an opening 22 thereof. A lower hinge portion 26 is shown connected to the base 12 by means of a similar rivet member 28 to that of rivet member 20.

The hinge members 16 and 26 are formed as one continuous hinge member in conjunction with a living hinge 30. The living hinge 30 allows for flexible movement of the entire hinge member. It should be understood that any particular hinge can be utilized to hinge the top 14 to the base 12. The hinge herein was shown as a particular example wherein the plastic hinge has been utilized. However, it should be understood that metal hinges and the like can also be used.

The base 12 comprises four upstanding walls. The four upstanding walls comprise a longitudinal pair of side walls 34 and 36 and a front wall 40 and a back wall 42. The respective front wall 40 and back wall 42 are all provided in such a manner as to create a base container that can be formed as a tub or other suitable shape in order to provide for the particular function as described hereinafter. The base 12 is shown with pad members 44 and 46 which can be in the form of small elastomeric circular pads to protect any underlying surface beneath the base when it is placed on such a surface.

The pads 44 and 46 are placed on either side of the base and are four in number to prevent any scratching of a surface therebeneath, as well as providing a nonslip characteristic to the base.

The top portion or cover 14 is formed of a relatively transparent plastic. The top cover 14 is formed with two lateral side walls 50 and 52. The lateral side walls 50 and 52 terminate at a rear wall 54 and a sloping front wall 56. The sloping front wall 56 provides for a specific setback that overlies the first of the small tubs, cartridges or inidvidualized containers that will be described hereinafter.

The lid or cover 14 has an elongated bead 60 that extends along the front thereof in order to provide a handle. This bead or handle 60 allows for a lifting of the cover 14 upwardly.

The transparency of the cover 14 permits a view of the materials within the cover for a facile and ready identification in the manner which will be described hereinafter. Thus, ready access and a view of any magnetic media stored in the container 10 is readily apparent to a user.

Looking more particularly at the modular portions, buckets, pockets, cartridges or individualized containers of this invention, it can be seen that there are five hinged individual containers, cartridges, pockets, or buckets 70. Each cartridge, container, or bucket 70 that can be in the form of the individualized containers, tilts backwardly and forwardly to accommodate a view. Furthermore, they are stair stepped so that a total of twenty-five disk titles can be read within each container 10. Each individual container tilts forwardly for easy disk access and they can furthermore snap out from the container when they are to be used at another work station. The cartridges or containers 70 can be color oriented to designate a particular series of disks therein.

Looking more particularly at each individualized container, bucket, or cartridge 70, it can be seen that they comprise a front wall 72 and a rear wall 74. The front wall 72 has a lip 76 thereon, as well as the rear wall 74 having a lip 78. The rear wall 74 extends downwardly to the base of the individualized container 70 in the form of an extension 80. The extended wall 80 is approximately at the same bottom dimensional point as the front wall 72. The two respective walls terminate in side walls 84 and 86.

The walls 84 and 86 terminate at the bottom in a relatively coterminal base area to surround the base in conjunction with the walls 72 and 74.

The walls 84 and 86 at their upper surfaces terminate in a sloping side wall configuration, at surfaces 90 and 92 of the respective walls 84 and 86.

Each wall 84 and 86 has a plurality of grooves 98 that have been established by flanges, ledges or ridges 100. The flanges, ledges or ridges 100 serve to create the grooves 98 therebetween which are shown as five in number.

Each groove 98 and flange or ledge 100 terminates at a base wall portion 104. Each base wall portion 104 provides for a base against which a diskette can be implaced and rested on. Each base wall 104 is in a stair stepped relation by having the groove adjacent to it extend in a stair stepped relationship by means of a riser 106 connected to each base or step 104.

Figure 3:
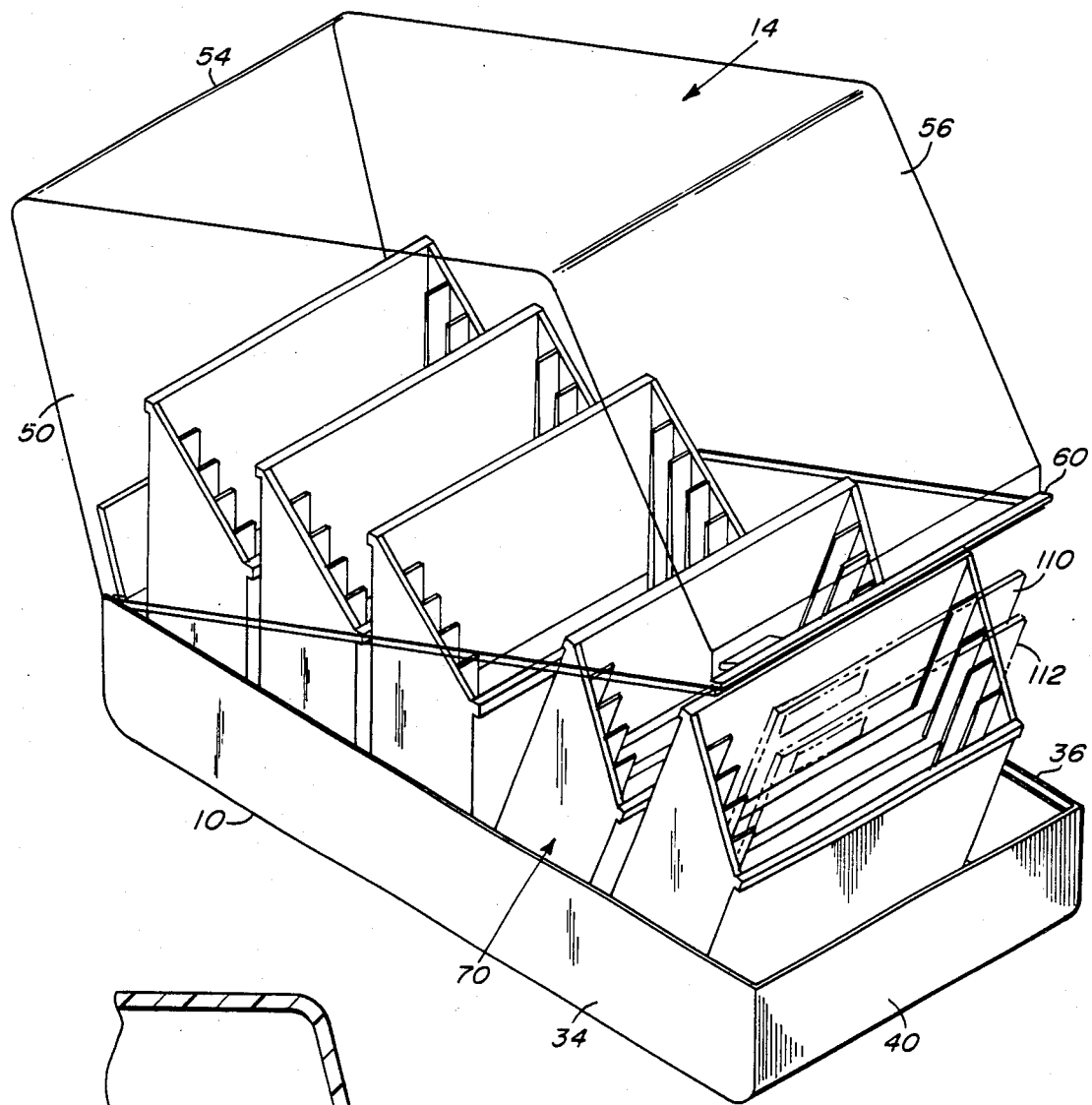
FIG. 3 shows the container of this invention with the top being hinged backwardly and two of the respective small pivotal containers being leaned forwardly in order to provide for removal or visual exposure of magnetic media therein.

The risers 106 accomplish the purpose of providing the stair stepped relationship upwardly and downwardly so that the respective disks or diskettes can be viewed with their titles in the manner as shown in FIG. 3.

In FIG. 3, it can be seen that the stair stepped relationship with diskettes 110 and 112 in the front container 70 allows for the viewing of each diskette on a stair stepped relationship so that the titled such as a title written across the front of diskette 110 shown on space 114 can be read.

Figure 4:
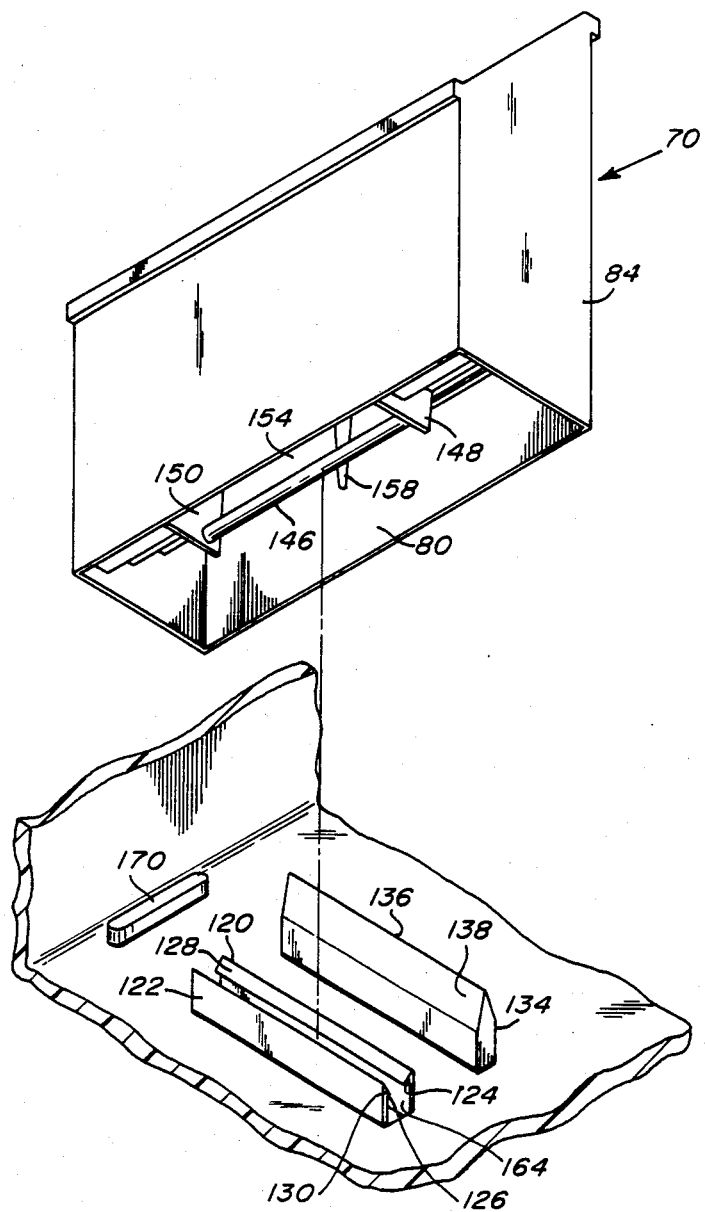
FIG. 4 shows a bottom view looking upwardly at one of the individual containers when it is unseated from the pincer walls of the base of the main container which is shown in fragmented form.

In order to provide for greater access of each individualized container or bucket 70, a pivotal mounting orientation is established therefor. This pivotal orientation is by means of pincer walls 120 and 122. The pincer walls 120 and 122 have upper inwardly sloping tangs or barbs as can be seen in FIG. 4. in particular, upper tang or barb 124 on pincer wall 120 is shown, and a tang or barb 126 on pincer wall 122 is also seen. The respective walls 120 and 122 have interior sloping surfaces 128 and 130 by virtue of the barb's sloping entrance surfaces. The sloping surfaces 128 and 130 allow for implacement in a facile manner of the containers 70 in the manner that will be described hereinafter. The barbs on the walls can be substituted by way of at least one protuberance on one wall so that it engages the pin or spindle 146 under the protuberance between the walls. The walls can also be defined as interiorly sloping walls providing a narrower entrance or upper opening dimension less than the dimension between the walls as they extend inwardly toward the base.

In order to provide an indexing of the movement of container 70, a tapered upright index wall 134 is shown. The tapered upright index wall 134 has sloping surfaces 136 and 138. The foregoing sloping surfaces 136 and 138 allow a smooth indexing of the rear wall extension 80 as it rides down over the indexing wall 134. Furthermore, it provides for a smooth interface as the container 70 is tilted backwardly and forwardly.

Looking more particularly at the individualized container or bucket 70, it can be seen wherein a spindle 146 is shown. Spindle 146 is braced between two extending lower bracket walls 148 and 150. The lower extending bracket walls 148 and 150 support the spindle 146 which is spanned therebetween. The bracket walls 148 and 150 are molded in a manner to have them extend up to the first and second steps 104.

In order to allow for a proper injection molding of the stair steps, an open area 154 is shown above the spindle 146. The open area 154 allows for the utilization during the molding process of the material so that the respective side brackets 148 and 150 supporting the spindle 154 are provided.

A depending member 158 is shown that is the portion of the residual from the molding process.

Looking more particularly at the container 70, it can be seen where it is implaced with the spindle 146 within the side walls 120 and 122. This implacement between the side walls 120 and 122 is accomplished by the outside diameter of the spindle 146 being slightly larger than the inside dimensional extensions of the barbs 124 and 126 substitute protuberance, or entrance opening. Upon implacement of spindle 146 against the barbs, the protuberance or entrance walls 120 and 122 expanded slightly aside.

The entire container is formed from a resilient plastic and as a consequence, the walls 120 and 122 have sufficient resiliency to expand slightly and allow the admission of the spindle 146 therebetween. This is also facilitated by the sloping nature of the barbs 124 and 126 having the sloping walls 128 and 130. As they are spread apart by the spindle 146, they allow the entrance of the spindle 146 into a space 164 therebetween.

The space 164 allows for pivotal movement of the spindle 146. The base of the barbs facing interiorly of the walls 120 and 122, thereafter catch the spindle 146 in a manner so that it is trapped in a resilient manner by the walls and barbs overlying it. However, the spindle 146 can be lifted upwardly and outwardly from its secured relationship when the box or container 70 is moved upwardly, spreading apart the walls 120 and 122 for removal and access of the container 70 in a separate location.

Figure 2:
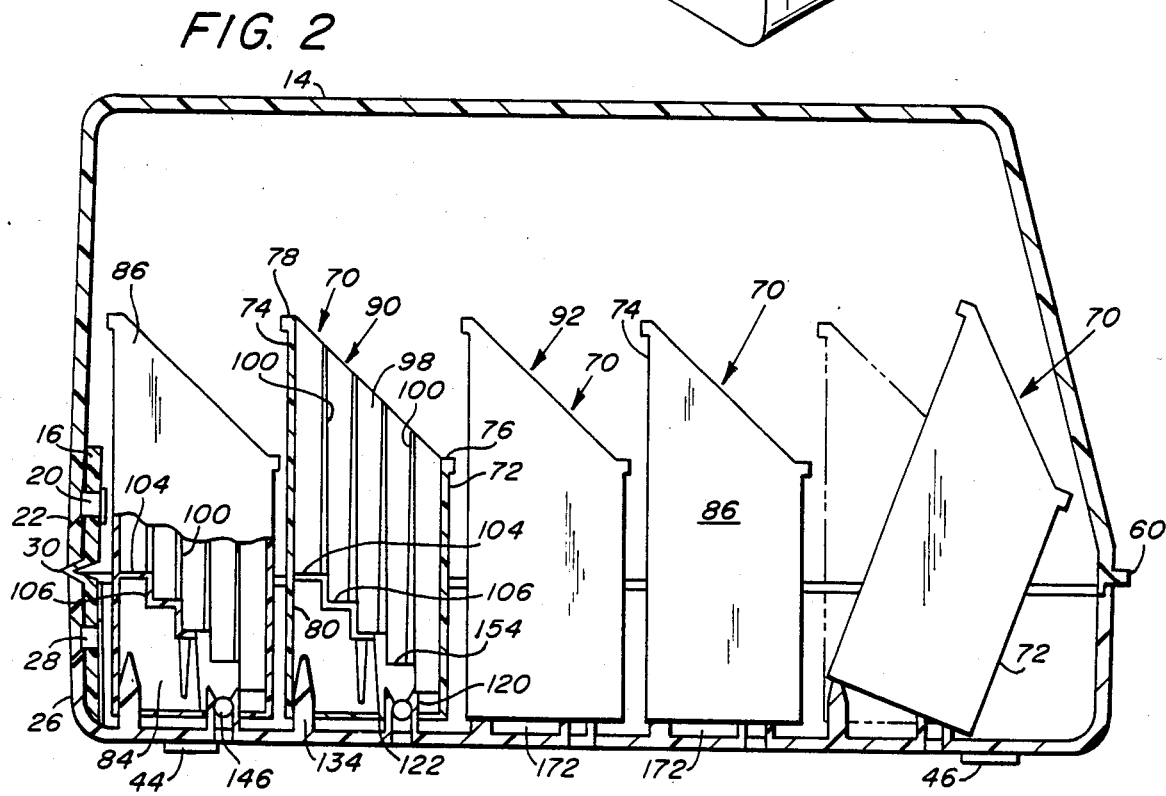
FIG. 2 shows a view sectioned in the direction of lines 2—2 so as to expose the side view of the containers and the sectioned portion of the main container and a portion of the individualized containers therein.
Figure 5:
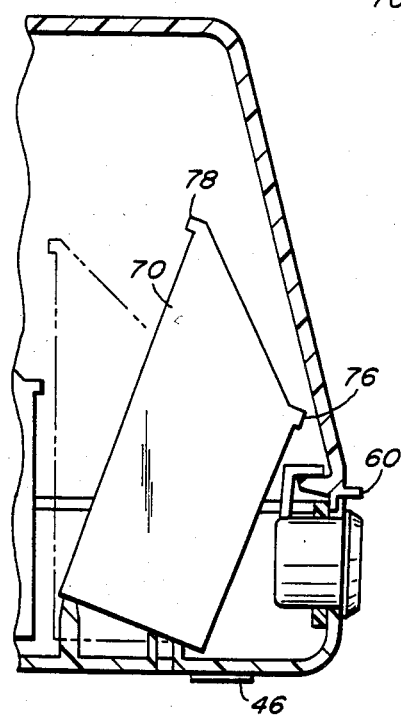
FIG. 5 shows a detailed view of the articulated movement of one of the individual containers as it pivots backwardly and forwardly within the base orientation thereof.

The foregoing securement allows for the container 70 to be pivoted forwardly as seen in FIGS. 3 and 5. The pivoting forwardly of the containers seen in FIGS. 3 and 5, as well as FIG. 2, shows that the container can be viewed and magnetic media withdrawn therefrom by a movement forwardly.

In order to provide for a stop of the container 70 in its backward orientation, a plurality of stops 170 and 172 are shown on either side of the containers. The stops 170 and 172 are such wherein they allow the base of the side walls 84 and 86 to rest thereagainst at their bottom portion. In this manner, the stops 170 and 172 prevent further tilting backwardly of the container 70. In effect, they stop each container 70 against the stop to allow for spacing as seen between the front lips 76 and the back wall 74 of each respective container 70 in its modular front to back relationship. Thus, the entire series of containers 70 are held in place in a removable manner and stopped so as to be oriented in each respective orientation next to each other with sufficient space and at the same time the capability of tilting them forwardly to view them.

Figure 6:
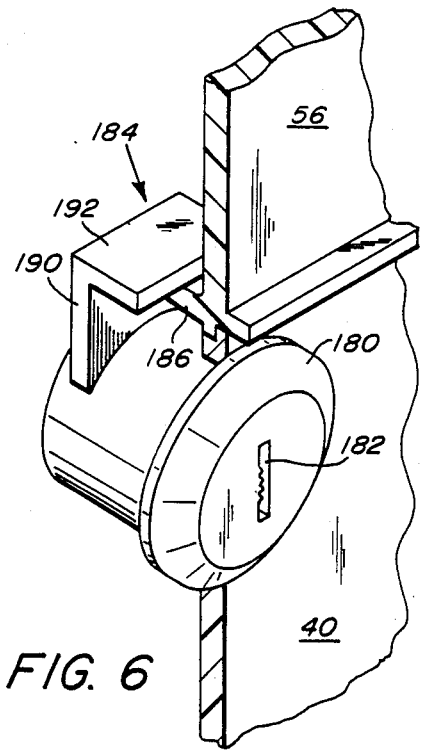
FIG. 6 shows a fragmented sectional view of the lock for locking the top of the container to the base.

An optional lock for the container is shown in FIG. 6. In particular, front wall 56 of the container with the bottom wall 40 is shown having a lock 180 implaced in the lower portion of the wall 40. The lock 180 can have a keyway 182 that provides access to a key which either turns a bolt 184 or causes it to slide backwardly over a ledge 186. The bolt 184 can be moved backwardly and forwardly depending upon the particular key orientation, or it can be rotated around the axis of the keyway 182 so as to not overlie the ledge 186 of the top container wall 56. The locking bolt 184 is shown as an inverted L shaped member having an upright portion 190 and a lateral portion 192. However, it should be understood that any particular bolt and locking configuration can be used in cooperation with any type of ledge 186 or similar configuration.

Figure 7:
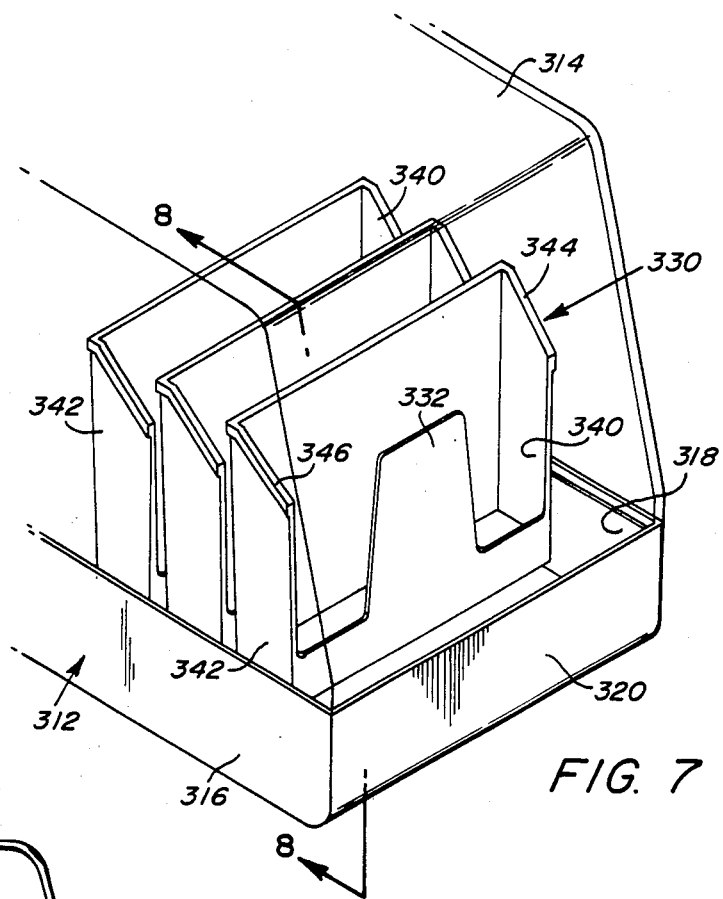
FIG. 7 shows alternative individualized containers which employ fan tabs for accessing media therein, and have a slightly different way of mounting in the base of the main container.
Figure 8:
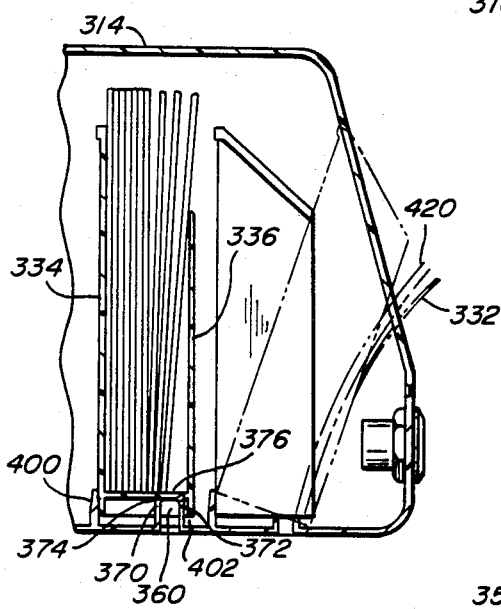
FIG. 8 shows a fragmented sectional view of the attachment means for the individualized containers in the direction of lines 8—8 of FIG. 7.
Figure 9:
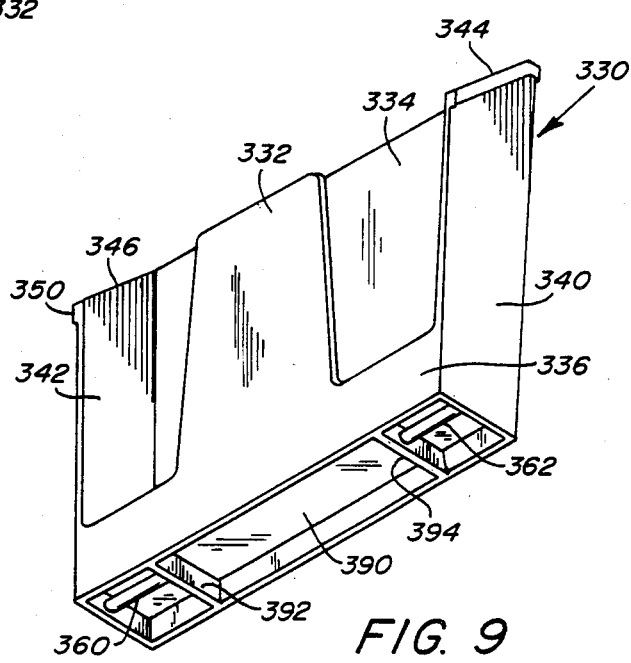
FIG. 9 shows a perspective view looking upwardly at the bottom of one of the individualized containers.

Looking at FIGS. 7 through 9, it can be seen that an alternative embodiment is shown that differs slightly from the foregoing embodiment. In particular, a specific embodiment is shown that can encapsulate approximately sixty 5¼ inch diskettes. The diskettes are neatly filed in six color oriented removable cartridges. The foregoing embodiment showed a plurality of five cartridges or containers 70. The foregoing were utilized for not only disks and diskettes, but also microdisks which are known in the art as having relatively rigid containerized configurations as opposed to the floppy disks or diskettes of the 5¼ inch type which constitutes the disks being stored in the alternative embodiment hereof.

Looking at FIG. 7, it can be seen that a base container is shown. This base container comprises a base similar to base container 10. However, it has significantly different portions so as to constitute a different base 312. The base 312 is connected to a top similar to top 14, namely top 314. The top 314 is hinged with the hinge members as can be seen in FIGS. 1, 2 and 3. Thus, top 314 hinges to the bottom 312 as in the previous embodiment. Also, the bottom portion comprises side walls 316 and 318 with a front wall 320. The foregoing are analogous to the side walls 34 and 36 and the front wall 40. A rear wall analoguous to rear wall 42 is not shown.

The interior of the base member is different from the previous base interior by virtue of the fact that it incorporates a different configuration for holding the cartridges that have a fan tab. In order to help to understand the relationship of the base member 312 with the bottom portions, it should be understood that the bottom has a number of upstanding elements analogous to the previous upstanding elements that hold the fan tab cartridges hereof.

Looking more particularly at the fan tab containers, it can be seen that an individual fan tab cartridge or container 330 is shown having an upstanding tab 332 and a back wall portion 334. The upstanding tab 332 is an extension of a frontal wall portion 336 formed as an inverted T shaped member. The frontal wall portion 336 comprises the transverse first portion of the T with the tab 332 providing the upright portion of the T.

The frontal wall portion 336 is joined to the rear wall portion 334 by means of two side walls 340 and 342. The side walls 340 and 342 extned upwardly to sloping surfaces, respectively 344 and 346. These upper sloping surfaces define a ridge or spline 350 that extends along the outer sloping surfaces 344 and 346 around the back of the container or along the back wall 334. The foregoing ridge not only provides for a reinforcement, but also an area that can be grasped to tilt the containers 330 backwardly and forwardly.

Each of the containers 330 are pivotally secured by means of two pintals, spindles or pins 360 and 362. The pins 360 and 362 are such wherein they provide the same function as the rod, pin or spindle 146.

The foregoing pins 360 and 362 are driven into a pair of pincer walls analogous to walls 120 and 122. These pincer walls 120 and 122 are in effect of the same configuration as the foregoing pincer walls 120 and 122 but are such where they only extend a portion of the way on either side of the base.

To exemplify this, in FIG. 8 it can be seen that pincer walls 370 and 372 are shown. The pincer walls 370 and 372 have tapered tangs or barbs, such as the tapered portions 128 and 130. The tapered walls portions of pincer walls 370 and 372 have been labeled wall portions 374 and 376 to illustrate the tapered resilient aspects thereof. Thus, when the pins 360 and 362 are inserted into the tapered barbs or wall portions 374 and 376, they spread the resilient plastic apart to allow the insertion and seating of pins 360 and 362 therein on either side.

It should be understood that the wall portions 370 and 372 are matched with identical wall portions to receive the pins 362 on the opposite side thereof. This thereby enhances and enables one to specifically create a retention and insertion of the containers 330 therein, while at the same time allowing them to pivot backwardly and forwardly in an analogous manner to the container 70.

A space 390 is shown beneath the container which provides a boxed space with walls 392 and 394 at either end to help support the pins 360 and 362. Also, as can be seen, the transverse portions 336 and the back wall 334 terminate downwardly so as to form the box walled portion terminating to surround the space 390.

In addition to the foregoing, it can be seen whereby the wall 334 and front wall portion 336 also terminate downwardly to provide spaces for the seat of the pins 360 and 362. The pins are such wherein they extend between lateral wall portions 340 and 342 and the walls 392 and 394 and are surrounded by the extending portions of the extensions and walls 334 and 336.

The foregoing configuration allows for the termination of the back wall portion 334 and termination of the front wall portion 336 to provide a particular function at the end thereof. In particular, it can be seen that an indexing upright 400 is shown. The indexing upright permits the end of wall portion 334 to depend downwardly and be held in juxtaposition thereto. The downward extension allows for the end thereof to rest on the bottom of the container, namely, the area in adjacent relationship thereto.

The end of the wall 336 extends downwardly and is spaced by a space 402 from the bottom so that as it is tilted forwardly, it does not bind on the bottom of the container. This allows the tilting forwardly, as can be seen in FIG. 8 in the dotted phantom showing thereof. From the foregoing, it can be seen that the containers 330 can be tilted backwardly and forwardly in the analogous manner of containers 70. Furthermore, they can be removed by resiliently snapping them upwardly through the pincer walls 370 and 372 for removal thereof. This upwardly snapping movement between the pincer walls 370 and 372 allows them to be displaced and moved to different areas.

The foregoing containers 330 are easily replaced again by merely taking them and placing them into the pincer walls 370 and 372 on either side of the container by forcing them downwardly so as to allow the pins 360 and 362 to displace the pincer walls and be implaced therebetween. Accordingly, this invention is a substantial step over the prior art with regard to the removal of the containers 330 for orientation and utilization in various locations.

Also, as previously mentioned, the containers 330 can be arranged by color so that for example all red labels, white labels, yellow labels of a particular series of disks, minidisks, or diskettes stored therein can be placed in the particular containers 330 or 70 and thereby organized in an analogous manner by color. Thus, programs and particular aspects of a series can be categorized as such within the respective color coordinated containers that match the labels on the respective diskettes or disks.

In addition to the foregoing, it should be understood that the tabs 332 can be displaced forwardly in a manner whereby any disks or diskettes therein can be fanned through so as to allow for a view thereof. This is shown in FIG. 8 wherein a disk or diskette 420 is shown fanned with the forward upright portion 332 of the T so as to expose the diskettes 420 for view thereof.

As can be seen from the foregoing, the entire series of containers and analogous base, lid and other portions thereof, provide for a novel arrangement and organization of disks and diskettes. This organization can be such wherein the disks and diskettes are color arranged within the containers 70, 330, or indexed in any other particular manner. Also, the containers can be easily removed and implaced in another work station in order to allow for the facile access thereof and utilization. As a consequence, this invention should be read broadly in light of the following claims as to both general embodiments set forth hereinbefore.

I claim:

1. A container for containing magnetic media comprising:
   a base member;
   a cover adapted for overlying placement on said base member;
   a plurality of individualized containers having pivotal attachment means for interconnecting said individualized containers to said base member in a removable manner formed by a spindle in the base of each of said individualized containers; and,
   upstanding pincer means extending from said base member to receive said spindle for holding said spindle in the jaws of said pincer means.

2. The container as claimed in claim 1 further comprising:
   stops oriented for stopping said individualized containers from pivotal movement beyond a pre-established point.

3. The container as claimed in claim 1 wherein said pincer means comprise:
   two upstanding walls; and wherein,
   the space between said upstanding walls is defined at least in part in a lesser dimension than the diameter of said spindle so that as said spindle is inserted between said pincer walls, it will spread said pincer walls apart and upon further insertion retain said spindle therein for pivotal movement.

4. The container as claimed in claim 3 wherein:
   said individualized containers comprise a container having slotted side walls for receipt of diskettes within said slots;
   and wherein,
   the base of said individualized containers is stair stepped having steps at the base of each set of slots so that material stored therein can be maintained on a stepped basis.

5. The container as claimed in claim 3 wherein said individualized containers comprise:
   at least one upstanding tab member forming a portion of the front wall of said individualized containers for spreading and exposure of diskettes stored therebehind.

6. The container as claimed in claim 3 wherein said pincer comprises:
   a pair of upstanding walls; and,
   interiorly sloping tangs at the upper portion of said walls extending inwardly between said walls and forming a space therebetween of a lesser dimension than the diameter of said spindle so that as said individualized container spindles are pushed therein, they are retained behind the tangs after being spread and implaced therein.

7. The combination of a plurality of individualized containers for holding magnetic media and a surrounding container for holding said individualized containers comprising:
   a surrounding container formed with a base member having a cover connected thereto overlying said base member;
   a plurality of individualized containers adapted for pivotal connection to said base member and removal by means of a pair of pincers which are connected to said base member;
   a spindle connected to said individualized containers for receipt within said pincers for holding said individualized containers to said base member; and,
   said pincers having at least one internally directed protuberance spaced at a distance therebetween less than the diameter of said spindle so that as said spindle is inserted therein, it spreads said pincers apart and allows the insertion of said spindle therebetween.

8. The combination as claimed in claim 7 further comprising:
   said protuberance formed as a barb having a sloping interior surface angled inwardly toward the space between said pincers; and further comprising,
   resilient wall portions forming said pincers in part which can be spread when said spindle is implaced between said angular barb to spread said wall portions apart for receipt of said spindle therein.

9. The combination as claimed in claim 7 wherein:
   said individualized containers have a plurality of stair stepped slots for receipt of magnetic media therein.

10. The combination as claimed in claim 7 further comprising:
    at least one upright tab projecting as a portion of the frontal wall of said individualized containers which can be spread to allow access and viewing of magnetic media stored behind said wall and within said individualized container.

* * * * *